United States Patent [19]

Parnell

[11] Patent Number: 4,895,225
[45] Date of Patent: Jan. 23, 1990

[54] CYLINDRICAL HOSE GUIDE WHEEL CHOCK

[76] Inventor: John R. Parnell, 2101 Bateman Blvd., Camden, S.C. 29020

[21] Appl. No.: 251,244

[22] Filed: Sep. 30, 1988

[51] Int. Cl.⁴ .......................... B60T 3/00; F16L 11/00; B65H 23/04; A62C 23/04
[52] U.S. Cl. ...................... 188/32; 138/110; 226/196; 248/75
[58] Field of Search .......................... 188/4 R, 32, 382; 138/110, 178; 137/377, 343; D12/217; 118/506; 226/196, 197; 301/6 WB; 83/54; 248/75, 352

[56] References Cited

U.S. PATENT DOCUMENTS

| | | | |
|---|---|---|---|
| 1,556,327 | 10/1925 | Hughes | 188/32 |
| 1,914,743 | 6/1933 | Hughes | 188/32 |
| 2,442,501 | 6/1948 | Mast et al. | 188/32 |
| 4,778,135 | 10/1988 | Legard | 188/32 |

FOREIGN PATENT DOCUMENTS 1037425 9/1953 France .................... 188/32

Primary Examiner—Robert J. Oberleitner
Attorney, Agent, or Firm—Cort Flint

[57] ABSTRACT

A hose guide chock and method is disclosed in combination with a motor vehicle for preventing a hose (11, 11a) from being caught in a nip (16) between a tire (18) and ground (22). A cylindrical wedge (B) cut with an oblique rim (32) at approximately 38 degrees provides a tight fit against tire tread surface (18) so that an entrance space leading to nip (16) is closed as well as any nip between wedge body (B) and tire (18). A low body portion (12) is cut to define band (24) which strengthens the wedge (B) against accidental rollover and also provides wedging of the cylindrical body sufficiently to hold the wedge in place while the hose may be pulled both ways over the smooth outer cylindrical wall (28).

14 Claims, 2 Drawing Sheets

CYLINDRICAL HOSE GUIDE WHEEL CHOCK

BACKGROUND OF THE INVENTION

The invention relates to a wheel chock for guiding a hose around a rubber tire of an automobile and the like vehicle.

In many applications involving work on a vehicle with rubber tires, it is necessary for a mechanic or technician to pull a utility hose or cord around the corners of the vehicle. For example, when removing the wheels for tire balancing and the like, an air hose is pulled around the corners of the vehicle. During automobile painting, a similar rubber hose is pulled around the corners of the vehicle. A more common experience for the average automobile owner is pulling a water hose around the corners of the vehicle while washing the car. In all these instances, the hose easily becomes caught in a nip between the rubber tread surface of the tire and the ground. When the hose is caught in the nip, the hose must be pulled back out and pulled in another direction until it can be wrapped around the corners of the vehicle. Normally, once wrapped around the corner, the hose cannot be pulled any further until it is again pulled out of the nip and pulled outwardly and around the vehicle. It is extremely difficult, if not impossible, to freely pull the hose around the corners of the vehicle while walking around the vehicle. Use of electrical cords around wheeled vehicles involves similar problems.

While wheel chocks having a general wedge shape, such as disclosed in U.S. Pat. No. 3,301,352 are common for placement behind the front or rear tires of an automobile, they are normally not sufficient nor thought of as hose guides. In most instances, the conventional wheel chock would not serve satisfactorily as a hose guide. The wheel chock shape only partially fits between the tire and the ground and does not completely fill the nip space to prevent a hose from being caught. Another nip is formed by the chock surface and the tire surface so that the hose may be caught in the nip between the chock and the tire. U.S. Pat. No. 1,914,743 discloses automobile blocks which are fastened to a floor of a railroad car in front of and behind the automobile tires to prevent the automobile from moving relative to the floor. The blocks do not provide a wedge in the sense of a wheel chock and would not remain in place to guide a hose or suggest such an expedient. Providing a hose guide in the form of a chock which can be used with various wheel sizes and tire sizes is also a problem to which attention need be given.

A hose guide has been proposed in the form of a stirrup which is designed to rest on the ground and straddle the tire tread. The portion of the tire nip nearest the apex is closed. The stirrup is made of steel and springs inwardly to grip the tire to hold it in place. However, the stirrup strap is easy to dislodge. When pulling a hose in reverse directions around a vehicle, the hose sometimes doubles up and rides upon itself, and then catches in a bind in front of the stirrup.

Accordingly, an object of the invention is to provide a hose guide which may be placed in a nip between a tread surface of a tire and the ground to prevent a utility hose or cord from being caught in the nip when pulled around the corners of the vehicle.

Another object of the invention is to provide a hose guide wheel chock which can be chocked behind or in front of the wheel and completely cover a nip space between the wheel and the ground to prevent a hose or cord from being caught when pulled around the vehicle corner.

Another object of the invention is to provide a hose guide wheel chock which fits easily into and out of a wheel between a tire tread surface and the ground completely covering the gap therebetween to prevent a utility hose or cord from being caught between the tire and ground when being pulled around the corner of a vehicle.

Another object of the invention is to provide a hose guide wheel chock which will fit in a nip between the tire and the ground for a variety of tire sizes to prevent a hose or cord from being caught in the nip when being pulled around the vehicle corner.

SUMMARY OF THE INVENTION

The above objectives are accomplished according to the present invention by providing a hose guide in the form of a wheel chock having a rounded wedge shape. The rounded wedge body includes a low front wall which fits in the apex portion of the nip and an extended back wall which extends from the ground to the tire tread surface. The rounded wedge-shaped body completely fills the nip between the tire and the ground and has a rounded contoured surface over which the hose guide may slide to facilitate passage around the corners. The back wall of the rounded hose guide chock leaves no gap for the hose or cord to be caught between the tire and the chock body. The hose or cord may be easily pulled in opposite directions across the chock without dislodging the chock.

DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
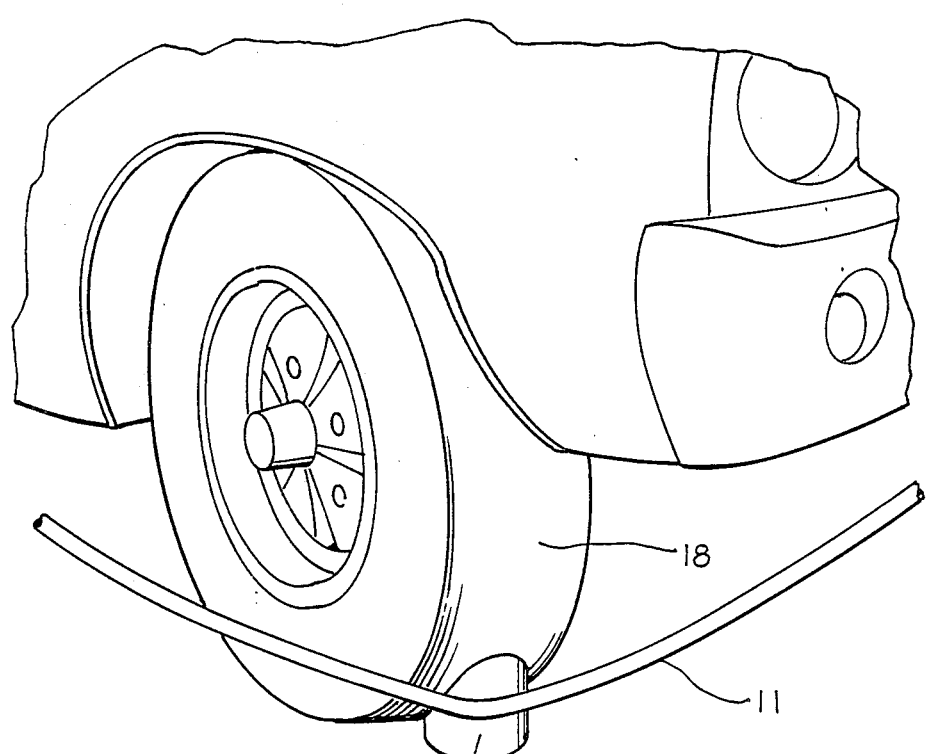
FIG. 1 is a perspective view illustrating a hose guide wheel chock according to the invention positioned in the nip of a front tire of an automobile for riding a hose around the corner and tire.
Figure 3:
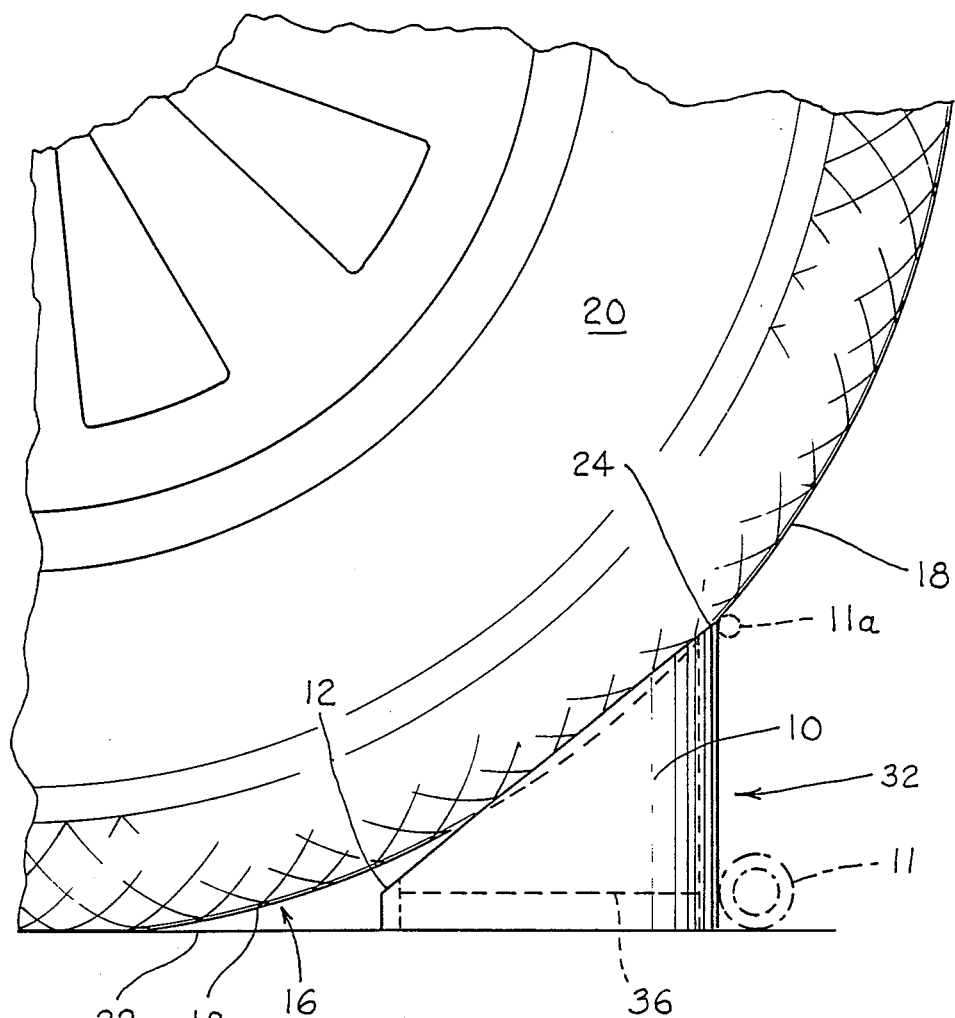
FIG. 3 is an enlarged elevation illustrating a hose guide wheel chock constructed according to the invention positioned in a hose guide relationship between the tire and the ground.

Referring now in more detail to the drawings, a hose guide wheel chock device designated generally as A is illustrated in the form of a cylindrical wedge B having a rounded exterior wall 10 which facilitates the passage of a hose 11 or cord 11a around the corner of a vehicle as can best be seen in FIG. 1. As can best be seen in FIG. 3, the rounded exterior wall has a low wall or body portion 12 which fits within an apex portion of a nip 16 formed between a tire tread surface 18 of a tire 20 and ground 22. Rounded exterior wall 10 further includes a high wall or body portion 24 which terminates at or near tire tread surface 18 as can best be seen in FIG. 3. Quite advantageously, the hose guide wheel chock is formed as a obliquely cut cylinder body 28 by which an open depression 30 is provided within its central area. Hollow interior 30 allows tire tread 18 to extend into the interior of cylinder body 28, as can best be seen in FIG. 3. In this manner, high wall portion 24 of wedge B may extend in close proximity to tire tread 18 so that no gap is left in an extreme space 32 to nip 16 or which will form a nip in which hose 10 may be caught between the hose guide chock and the tire. Wedge cylinder body 28 occupies the entire entrance space so that hose 10 is not caught between the tire and the ground or between the tire and the chock. It will be understood that hose as used in this application means a utility hose or cord.

Figure 2:
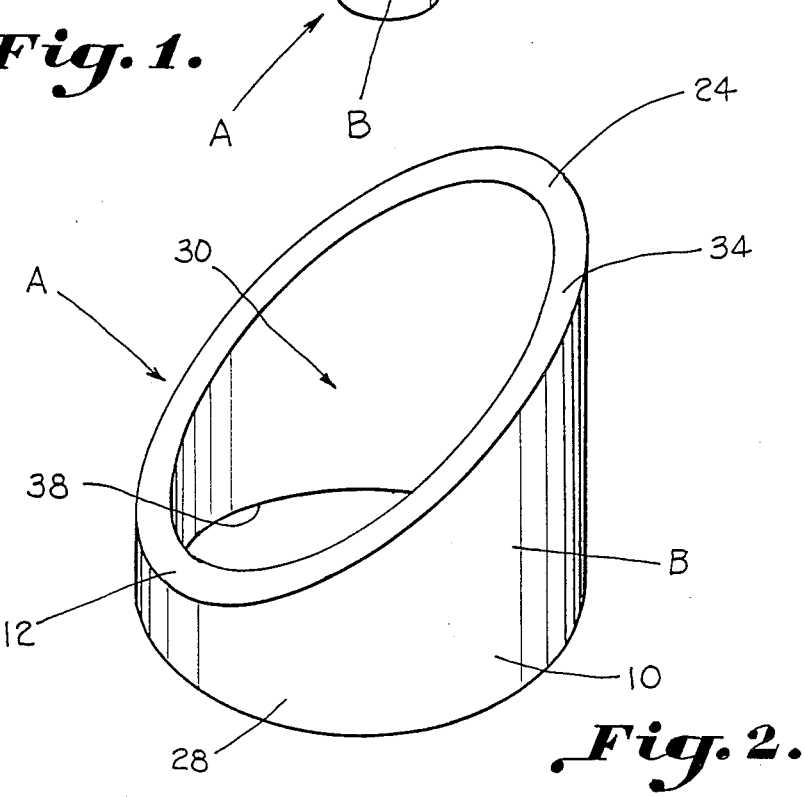
FIG. 2 is a perspective view of a hose guide wheel chock constructed in accordance with the present invention.

As can best be seen in FIG. 2, wedge body 28 is formed from a cylindrical pipe section having an upper continuous, curved rim 34 cut in an oblique angle to define low wall portion 12 and high wall portion 24 of wedge B. By cutting the rim at about 38 degrees, the hose guide chock may be used with a wide variety of passenger car tire sizes. Body portion 12 is sufficiently wedged for retention under two-way hose pulling, and hollow interior 30 allows tread entrance so high wall portion 24 terminates at or near tread surface 18 to close off entrance to nip 16 and prevent any nip between wedge body 28 and tire surface 18. It has been found that a pipe diameter of about 3 to 4 inches is preferably 3.5 inches, provides for an open interior space 30 sufficient to accommodate the different tire sizes with low wall 12 wedged in place. It will be noted that a band 36 is created around the circumference of the cylindrical wedge body as a parallel line is drawn from low part 12 equidistantly from the base 38 around the entire circumference of the cylindrical wedge body. This band is important in that sufficient strength is provided when the tire accidentally is driven over the chock. This reinforcement band strengthens the chock sufficiently so that the chock is not damaged beyond use if this event should occur. Preferably, the chock is formed from a section of PVC pipe. This results in enough resiliency so that taken together with the reinforcing band, the chock may be rolled over by the tire without destruction. An annular rim base 38 is provided for the wedge body.

Accordingly, it can be seen that an advantageous construction for a hose guide can be had according to the invention wherein a rubber hose or cord having a high friction coefficient may be easily pulled around all four corners of the vehicle without being caught. The hose guide in the form of a wheel chock may accommodate a wide variety of wheel sizes in a manner that the high back wall of the wheel chock closes the nip between the tire and the ground sufficiently to prevent the hose from being caught between any portion of the tire and the ground or chock. Further, the rounded circumferential surface of the perimeter of the pipe provides a low friction surface over which a hose may be easily pulled without removing the chock. The chock may be wedged between the tire sufficiently and the hose pulled over the tire in reverse direction with the chock reliably remaining in place.

While a preferred embodiment of the invention has been described using specific terms, such description is for illustrative purposes only, and it is to be understood that changes and variations may be made without departing from the spirit or scope of the following claims.

What is claimed is:

1. A hose guide chock for use with a vehicle having rubber tires to prevent a hose from being caught in a nip between the ground and a tread surface of the tires when the hose is pulled around a corner of the vehicle comprising:
   a wedge-shaped body having a base supported on said ground;
   a low body portion included in said wedge-shaped member which fits in said nip of one of said tires;
   a high body portion included in said wedge-shaped body opposite said low body portion which extends upwardly from said base generally the entire distance from said ground to said tread surface so that an entrance space to said nip of the tire is completely closed; and
   a rounded wall means carried by said base extending generally perpendicular between said low body portion and said high body portion which is engaged by said hose to guide said hose around said wedge-shaped body while said low body portion occupies said nip of said tire and said high body portion prevents said hose from entering said entrance space to said nip as said hose is pulled around the corner of said vehicle and said one tire.

2. The device of claim 1 wherein said wedge shaped body consists of a cylinder and includes an inclined surface extending from said low body portion to said high body portion having an angular inclination of about 38 degrees with respect to the ground.

3. The device of claim 2 wherein said cylinder has a diameter in the range of 3 to 4 inches.

4. The device of claim 3 wherein said cylinder has a diameter of about 3.5 inches.

5. The device of claim 3 wherein said inclined surface consists of continuous, curved rim inclined at about 38 degrees with an area inside of said rim being open for receiving the portion of said tread surface so that said wedge body may accommodate a variety of tire sizes.

6. A hose guide chock for use in connection with a vehicle having rubber tires near its corners to prevent a hose which is pulled around one of said corner and one of said tire of said vehicle from getting caught in a nip between said one tire and the ground comprising:
   a cylindrical wedge having a base supported on said ground;
   a low body portion included in said cylindrical wedge which fits in said nip of said one tire;
   a high body portion included in said cylindrical wedge opposite said low body portion which extends generally perpendicular and upwardly from said base generally the entire distance from said ground to said tread surface so that an entrance space to said nip of said one tire is completely closed;
   a band carried by said base which extends around a periphery of said cylindrical wedge defined by a parallel extension of said low body portion around cylindrical wedge;
   an inclined upper free wall extending from said band upwardly near said tread surface of said one tire;
   a hollow interior formed within said cylindrical wedge; and
   said cylindrical wedge being constructed and arranged with said low body portion of said band fitting in said nip while said high body portion extends generally from said ground to said tread surface to fill an entrance space leading to said nip with a circumferential portion of said tread surface being received within said hollow interior of said wedge body.

7. The device of claim 6 including an inclined plane extending between an upper edge of said low body portion of said band and a top edge of said high body portion, said tread surface extending through said plane into said hollow portion of said cylindrical wedge when inserted in said nip.

8. The device of claim 7 wherein said inclined plane extends at an angle of about 38 degrees with respect to the ground.

9. The apparatus of claim 6 wherein said cylindrical wedge includes a rounded cylinder wall and which guides said hose around said vehicle corners.

10. The apparatus of claim 6 wherein said cylindrical wedge consists of a cylindrical pipe having an oblique cut wherein a lowermost edge on said oblique cut defines said top edge of said band and an uppermost point on said rim of said cut defines said high body portion adjacent said tread surface, said cylindrical wedge having an open area within said rim for accommodating different tire sizes.

11. In a motor vehicle, a hose guide chock for use with a vehicle having rubber tires to prevent a hose from being caught in a nip between the ground and a tread surface of a tire when the hose is pulled around a corner of the vehicle comprising:

a cylindrical wedge having a rounded outer wall for presenting a smooth guide to the passage of said hose over said wedge;

a low front wall portion for fitting in said nip;

a high back wall portion extending generally the entire distance between the ground and said tread surface to close an entrance space leading to said nip;

a cylindrical wall around the perimeter of said wedge body facilitating sliding of said hose over said wedge, said cylindrical wall extending generally perpendicular from said ground to said high back wall portion and terminating in a free upper edge rim slanted obliquely between said low wall portion and high wall portion, and a hollow open interior formed interiorally within said cylindrical wall of said wedge to permit said tread surface of said tire to extend past a plane extending between said low portion and high portion of said wall means for effectively closing off said nip space for different size vehicle tires.

12. The device of claim 11 wherein said high back wall portion extends generally at a right angle to said base.

13. The device of claim 11 wherein said upper free rim extends at an inclination of about 38 degrees to said ground.

14. The device of claim 12 wherein said cylindrical wedge has a diameter in the range of about 3 to 4 inches.

* * * * *